(12) United States Patent
Gong (10) Patent No.: US 10,348,154 B2
(45) Date of Patent: *Jul. 9, 2019

(54) SHOCK ABSORPTION MECHANISM OF STEERING MOTOR

(71) Applicant: GUANGDONG HUA'CHAN RESEARCH INSTITUTE OF INTELLIGENT TRANSPORTATION SYSTEM CO., LTD., Shenzhen, Guangdong Province (CN)

(72) Inventor: Shugang Gong, Bao'an Shenzhen (CN)

(73) Assignee: GUANGDONG HUA'CHAN RESEARCH INSTITUTE OF INTELLIGENT TRANSPORTATION SYSTEM CO., LTD, Shenzhen, Guangdong Province (CN)

( * ) Notice: Subject to any disclaimer, the term of this patent is extended or adjusted under 35 U.S.C. 154(b) by 212 days.

This patent is subject to a terminal disclaimer.

(21) Appl. No.: 15/300,534

(22) PCT Filed: Mar. 31, 2014

(86) PCT No.: PCT/CN2014/074346
§ 371 (c)(1),
(2) Date: Sep. 29, 2016

(87) PCT Pub. No.: WO2015/149207
PCT Pub. Date: Oct. 8, 2015

(65) Prior Publication Data
US 2017/0110931 A1    Apr. 20, 2017

(51) Int. Cl.
*H02K 5/24*        (2006.01)
*B62D 5/04*        (2006.01)
(Continued)

(52) U.S. Cl.
CPC ............... *H02K 5/24* (2013.01); *B62D 5/04* (2013.01); *B62D 5/0418* (2013.01); *B62D 7/02* (2013.01);
(Continued)

(58) Field of Classification Search
CPC .. H02K 5/24; H02K 5/04; H02K 5/10; H02K 5/15; H02K 23/04; H02K 19/02;
(Continued)

(56) References Cited

U.S. PATENT DOCUMENTS 2,589,341 A  *  3/1952  Chisholm, Jr. ....... B64C 25/505
                                                    180/429
3,657,967 A  *  4/1972  Suzuki ..................... B62D 5/08
                                                    91/372
(Continued)

FOREIGN PATENT DOCUMENTS

CN    103404005      11/2013
JP    2012080620     4/2012
KR    20020015420    2/2002

OTHER PUBLICATIONS

International Search Report issued in International Application No. PCT/CN2014/074346 dated Dec. 23, 2014 (2 pages).

*Primary Examiner* — Edgardo San Martin
(74) *Attorney, Agent, or Firm* — Hamre, Schumann, Mueller & Larson, P.C.

(57) ABSTRACT

Disclosed is a shock absorption mechanism of a steering motor, comprising an upper cover buffering assembly (1), and an oil distributor (2) disposed below the upper cover buffering assembly (1), the oil distributor (2) being fitted with the upper cover buffering assembly (1) to form a sealed axial cavity (4). A cylinder assembly (5) is fixedly arranged below the oil distributor (2). The cylinder assembly (5) comprises a cylinder (51) opened at both ends, and an elastic oil bag (52) arranged in the cylinder (51) and having an (Continued)

opening at the upper end, the upper end of the elastic oil bag (52) being fixedly connected to an inner wall of the cylinder (51), and the upper end of the elastic oil bag (52) being in communication with the axial cavity (40). The cylinder (51) is further provided internally with a piston (53) axially sliding along the cylinder (51), the piston (53) being connected to the lower end of the elastic oil bag (52). The shock absorption mechanism for a steering motor overcomes the problem of member damage due to friction and the defect of susceptibility to temperature in a traditional hydraulic shock absorption system, so as to prolong the service life of the shock absorption mechanism.

16 Claims, 6 Drawing Sheets

(51) Int. Cl.
　　*B62D 7/22*　　(2006.01)
　　*H02K 7/16*　　(2006.01)
　　*H02K 5/04*　　(2006.01)
　　*B62D 7/02*　　(2006.01)
　　*H02K 5/00*　　(2006.01)
　　*B62D 5/00*　　(2006.01)
　　*B62D 7/00*　　(2006.01)
(52) U.S. Cl.
　　CPC ............... *B62D 7/22* (2013.01); *H02K 5/04* (2013.01); *H02K 7/16* (2013.01)

(58) Field of Classification Search
　　CPC .......... H02K 9/22; B62D 5/04; B62D 5/0418; B62D 5/0403; B62D 5/0409; B62D 5/0421; B62D 7/22; F16C 33/78; F16C 33/7816; F16C 33/782
　　See application file for complete search history.

(56) References Cited

U.S. PATENT DOCUMENTS

| | | | | |
|---|---|---|---|---|
| 4,632,641 | A | * 12/1986 | Liska | ............... B62D 6/00 417/273 |
| 4,699,231 | A | * 10/1987 | Lang | ............... B62D 5/22 180/428 |
| 5,961,309 | A | * 10/1999 | Harpole | ........... F04C 15/0049 417/540 |
| 6,144,137 | A | 11/2000 | Engelbert | |
| 7,061,147 | B2 | * 6/2006 | Ries | ............... B63H 5/125 310/51 |
| 2013/0249356 | A1 | * 9/2013 | Nakano | ............... H02K 5/24 310/68 D |
| 2015/0357878 | A1 | * 12/2015 | Fukunaga | ............ H02K 3/50 310/71 |
| 2017/0106901 | A1 | * 4/2017 | Gong | ............... B62D 5/062 |
| 2017/0110926 | A1 | * 4/2017 | Gong | ............... H02K 7/14 |
| 2017/0110927 | A1 | * 4/2017 | Gong | ............... H02K 5/24 |
| 2018/0111643 | A1 | * 4/2018 | Kim | ............... B62D 5/0409 |
| 2018/0148091 | A1 | * 5/2018 | Krieger | ............... F16F 15/04 |

* cited by examiner

SHOCK ABSORPTION MECHANISM OF STEERING MOTOR

FIELD OF THE INVENTION

The present application relates to the technical field of hydraulic shock absorption, especially to a shock absorption mechanism of a steering motor.

BACKGROUND OF THE INVENTION

With continuous development of automobile industry, steering systems of automobiles have obtained rapid progresses, and an electric power steering system is the development direction of automobile steering systems. The steering power of the system is directly provided by a steering motor some components required by traditional hydraulic power steering systems are then omitted, and hence not only is energy saved but also the environment is protected. Furthermore, the system further has features that it is easy to be adjusted and flexible to be assembled and the steering power can be provided under various circumstances.

When a driver operates a steering wheel to veer, a torque sensor detects the veer of the steering wheel and the extent of the torque, and transmits a voltage signal to an electronic control unit. The electronic control unit sends an instruction to a steering motor controller according to the torque voltage signal, the steering direction, and the automobile speed signal detected by the torque sensor, and makes the steering motor output a steering power torque with corresponding magnitude and direction, thereby producing auxiliary power. When the automobile does not veer, the electronic control unit will not send any instruction to the motor controller, and the motor does not work.

In order to overcome the influence that the bad road conditions cause shocks of the steering motor, a shock absorption system is arranged inside the steering motor; however, a traditional shock absorption system utilizes a carbon brush and a collector ring, when the steering motor suffers shocks, the shock absorption system constantly buffers the shocks, which makes the carbon brush and the collector ring be rubbed continuously, hence the carbon brush and the collector ring are prone to wear and damage due to friction. Furthermore, the carbon brush and the collector ring are sensitive to the temperature, and are prone to damage because of temperature changes, such that the stability and service life of the steering motor are seriously affected.

SUMMARY OF THE INVENTION

Technical Problems

A purpose of the present application is to provide a shock absorption mechanism of a steering motor, which aims at overcoming the defects in the prior art that: in a traditional shock absorption mechanism of a steering motor, constant friction among components inside a cylinder assembly makes the structure be worn and damaged, and the temperature changes make the structure be damaged, such that the stability and service life of the steering motor are affected.

Technical Solutions

A technical solution provided by the present application is that: a shock absorption mechanism of a steering motor is arranged inside the steering motor. The shock absorption mechanism includes an upper cover buffering assembly and an oil distributor arranged under the upper cover buffering assembly; the oil distributor is fitted with the upper cover buffering assembly to form a hermetical axial cavity; a cylinder assembly is fixedly arranged under the oil distributor; the cylinder assembly includes a cylinder with openings defined at two ends thereof, and an elastic oil bag arranged in the cylinder and defining an opening at an upper end thereof; the upper end of the elastic oil bag is fixedly connected to an inner wall of the cylinder and communicated with the axial cavity; the cylinder is further provided therein with a piston that is capable of sliding axially along the cylinder; the piston is connected to a lower end of the elastic oil bag.

Preferably, the upper cover buffering assembly includes an upper cover and a buffering assembly; the buffering assembly includes an elastomer, an elastic spacer and an elastic diaphragm which are laminated inside the axial cavity in sequence; an edge of the elastic diaphragm is embedded into a lower margin of the inner side of the upper cover and fixedly connected with an inner wall of the axial cavity and forms a seal.

Furthermore, a bottom end of the oil distributor is provided with a damping hole, wherein the damping hole is arranged to be aligned with the top end of the elastic oil bag, and is in communication with the axial cavity and the elastic oil bag respectively.

Furthermore, an aperture of the damping hole is smaller than a caliber of the opening of the upper end of the elastic oil bag.

Preferably, the elastic diaphragm is butterfly-shaped; the oil distributor and the upper cover buffering assembly are fitted with each other to form a seal through a fastener.

Furthermore, the oil distributor is provided with an oil flow passage arranged radially and in communication with the axial cavity; the oil distributor is provided with an oil inlet; a hollow column that has an inner cavity is arranged axially and extends upwards and downwards respectively inside the oil distributor; an inner wall of the hollow column is provided with an oil flow opening in communication the oil flow passage.

Furthermore, an inner side of the hollow column is provided with a reversing valve which has a valve core; an inner sidewall of the hollow column and an outer wall of the reversing cavity form a first radial cavity; the first radial cavity is embedded with a pin; the first radial cavity is separated by the pin to form an oil-distributor oil-inlet cavity and an oil-distributor oil-outlet cavity which are independent of each other; the oil-distributor oil-inlet cavity is in communication with the oil inlet, and the oil-distributor oil-outlet cavity is in communication with the axial cavity;

an upper portion of a sidewall of the valve cavity is provided with a reversing-valve oil-flow passage arranged to penetrate radially. An axial lower portion of the reversing-valve oil-flow passage is provided with an oil flow hole arranged radially;

an oil-flow ring slot with a semicircle shaped section is arranged around an outer wall of an upper portion of the valve core; the oil-flow ring slot is respectively in communication with the oil-distributor oil-inlet cavity and the oil-distributor oil-outlet cavity;

a second radial cavity is formed between an outer wall of a lower end of the valve core and a sidewall of a lower portion of the valve cavity. A lower portion of the valve cavity is provided with an oil outlet, and the oil outlet is in communication with the second radial cavity.

Furthermore, the reversing valve further includes a winding coil positioned under the oil distributor and sheathed around a periphery of the valve cavity.

Preferably, the absorption mechanism includes a plurality of the cylinder assemblies; each of the cylinder assemblies is positioned under the oil distributor, and is arranged in circular inside the steering motor.

Beneficial Effect

Compared with the prior art, the shock absorption mechanism of the steering motor provided by the present application adopts the elastic oil bag inside the cylinder assembly and communicates the elastic oil bag with the cavity hermetically, such that the defects that a traditional hydraulic shock absorption system is prone to structural damage due to friction and sensitive to the temperature are overcome, thereby prolonging the service life of the shock absorption mechanism and saving cost.

DETAILED DESCRIPTION OF THE PREFERRED EMBODIMENT

In order to make the purposes, technical solutions, and advantages of the present application clearer, the present application will be further described in detail hereinafter with reference to accompanying drawings and embodiments. It should be understood that the specific embodiments described herein are merely intended to explain but not to limit the present application.

The implementation of the present application will be described in detail hereinafter with reference to the following specific embodiments.

As shown in FIGS. 1-6, the present application provides a preferred embodiment.

Figure 1:
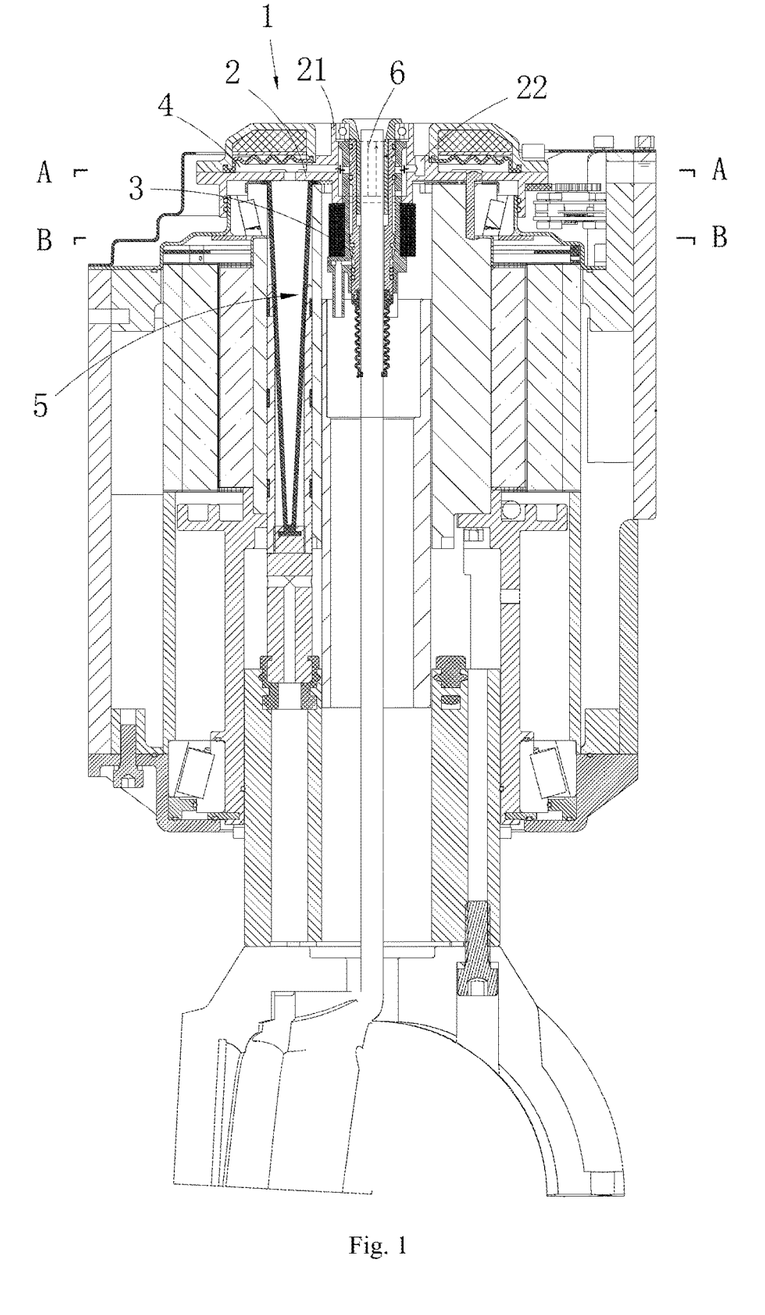
FIG. 1 is a sectional schematic view of shock absorption mechanism applied in a steering motor provided by an embodiment of the present application.
Figure 2:
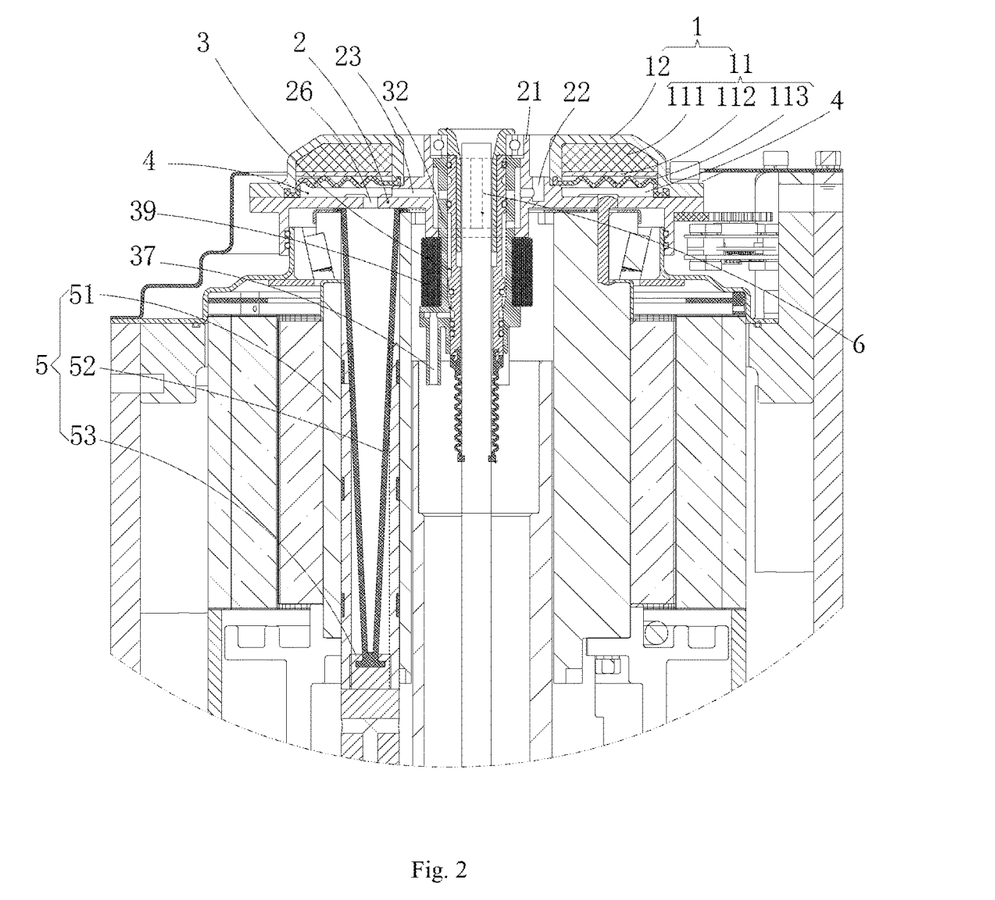
FIG. 2 is a partially enlarged schematic view of FIG. 1.

The embodiment provides a shock absorption mechanism of a steering motor, which is arranged inside the steering motor. The shock absorption mechanism includes an upper cover buffering assembly 1, an oil distributor 2 and a cylinder assembly 5; wherein the oil distributor 2 is arranged under the upper cover buffering assembly 1; the upper cover buffering assembly 1 is fitted with the oil distributor 2 to form a hermetical axial cavity 4; the axial cavity 4 is provided therein with a buffering assembly 11 which cooperates with oil fluid for buffering shocks; the cylinder assembly 5 is fixedly arranged under the oil distributor 2. The cylinder assembly 5 includes a cylinder 51, an elastic oil bag 52 and a piston 53. Two ends of the cylinder 51 are provided with openings; both the elastic oil bag 52 and the piston 53 are arranged in the cylinder 51; the elastic oil bag 52 is a saccular elastic diaphragm with an opening defined at an upper end thereof, and an edge of the opening at the upper end of the elastic oil bag 52 are fixedly connected with an inner wall of an upper opening of the cylinder 51, thereby forming a seal for the upper opening of the cylinder 51. Furthermore, the opening at the upper end of the elastic oil bag 52 is in communication with the axial cavity 4. Additionally, the piston 53 is fixedly connected to the lower end of the elastic oil bag 52, and the piston 53 is arranged in the cylinder 51 and capable of sliding axially along an inner cavity of the cylinder 51.

When the steering motor shakes, the piston 53 slides upwards and downwards in the cylinder 51 along with shocks of the steering motor; the elastic oil bag 52 is driven by the sliding to be stretched or compressed. When the elastic oil bag 52 is compressed, the oil fluid inside the elastic oil bag 52 will be squeezed out and flows into the axial cavity 4, then the oil fluid compresses the buffering assembly 11 and makes the buffering assembly 11 generate an elastic deformation, thereby buffering the shocks. When the elastic oil bag 52 is stretched, the oil fluid in the axial cavity 4 will flow back into the elastic oil bag 52, and the buffering assembly 11 recovers from the deformation.

The adoption of the aforesaid shock absorption mechanism to buffer and absorb shocks of the steering motor has the following features:

The sealed axial cavity 4 is formed by fitting the upper cover buffering assembly 1 with the oil distributor 2; a cylinder assembly 5 docked with the axial cavity 4 is arranged at a lower side of the oil distributor 2. Through the sealed communication between the elastic oil bag 52 of the cylinder assembly 5 and the axial cavity 4, the defect that components of the cylinder assembly 5 in a traditional hydraulic shock absorption mechanism are prone to wear and sensitive to temperature has been overcome by the elastic oil bag 52, thereby prolonging the service life of the shock absorption mechanism and saving cost.

In this embodiment, the upper cover buffering assembly 1 includes an upper cover 12 and the buffering assembly 11. The purpose of the buffering assembly 11 herein is to achieve buffer and shock absorption by elastic deformation thereof. The buffering assembly 11 includes an elastomer 111, an elastic spacer 112 and an elastic diaphragm 113. Wherein, the elastomer 111, the elastic spacer 112 and the elastic diaphragm 113 are laminated inside the axial cavity 4 in sequence from top to bottom. An edge of the elastic diaphragm 113 is embedded into a lower margin of the inner side of the upper cover 12 and fixedly connected with an inner wall of the axial cavity 4 to form a seal, therefore, the elastomer 111 and the elastic spacer 112 are sealed by the elastic diaphragm 113 inside a chamber formed by an inner wall of the axial cavity 4 and the elastic diaphragm 113. Herein, the elastomer 111 and the elastic spacer 112 can move inside the chamber. Surely, in other embodiments, according to actual conditions and requirements, the buffering assembly 11 can be of other types of buffer structures.

Figure 3:
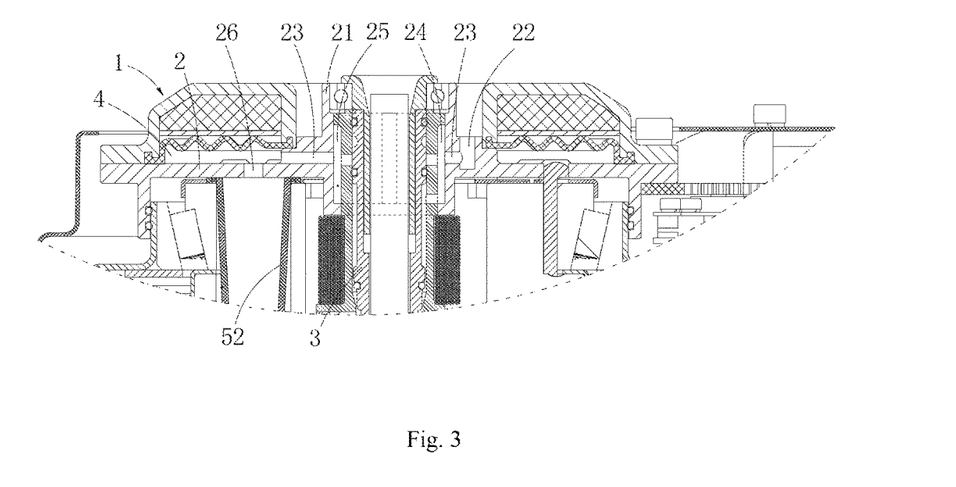
FIG. 3 is a partially enlarged schematic view of an oil distributor portion in FIG. 1.

An undersurface of the bottom end of the oil distributor 2 is provided with a damping hole 26, and the damping hole 26 is arranged to be aligned with the opening at the upper end of the elastic oil bag 52, in this way, the elastic oil bag 52 is in communication with the axial cavity 4 through the damping hole 26. Surely, in other embodiments, the elastic oil bag 52 can be in hermetical communication with the cavity 4 in other ways, such as a pipe connection or a passage connection, etc.

In addition, an aperture of the damping hole 26 is smaller than a caliber of the upper opening of the elastic oil bag 52. In this way, when the elastic oil bag 52 is compressed by the aforesaid piston 53, the oil fluid inside the elastic oil bag 52 will be squeezed out and flow into the axial cavity 4 through the damping hole 26. The damping hole 26 thus provides a shock absorption buffer function. Surely, this is just one buffering form; in other embodiments, other buffering forms can also be adopted.

In the embodiment, the elastic diaphragm 113 is butterfly-shaped. Surely, the structure of the oil distributor 2 matches with and corresponds to the structure of the upper cover buffering assembly 1; the oil distributor 2 and the upper cover buffering assembly 1 are fitted with each other and connected hermetically through a fastener. Surely, in other embodiments, according to actual conditions and requirements, the upper cover buffering assembly 1 and the oil distributor 2 can also adopt other types of structures.

In order to help oil fluid outside the steering motor flow into the shock absorption mechanism, the oil distributor 2 is provided with a hollow column 21, an oil inlet 22 and an oil flow passage 23 arranged radially and in communication with the axial cavity 4; an inner wall of the hollow column 21 is provided with an oil flow opening; through the oil flow opening, an inner cavity of the hollow column 21 is in communication with the oil flow passage 23.

Figure 4:
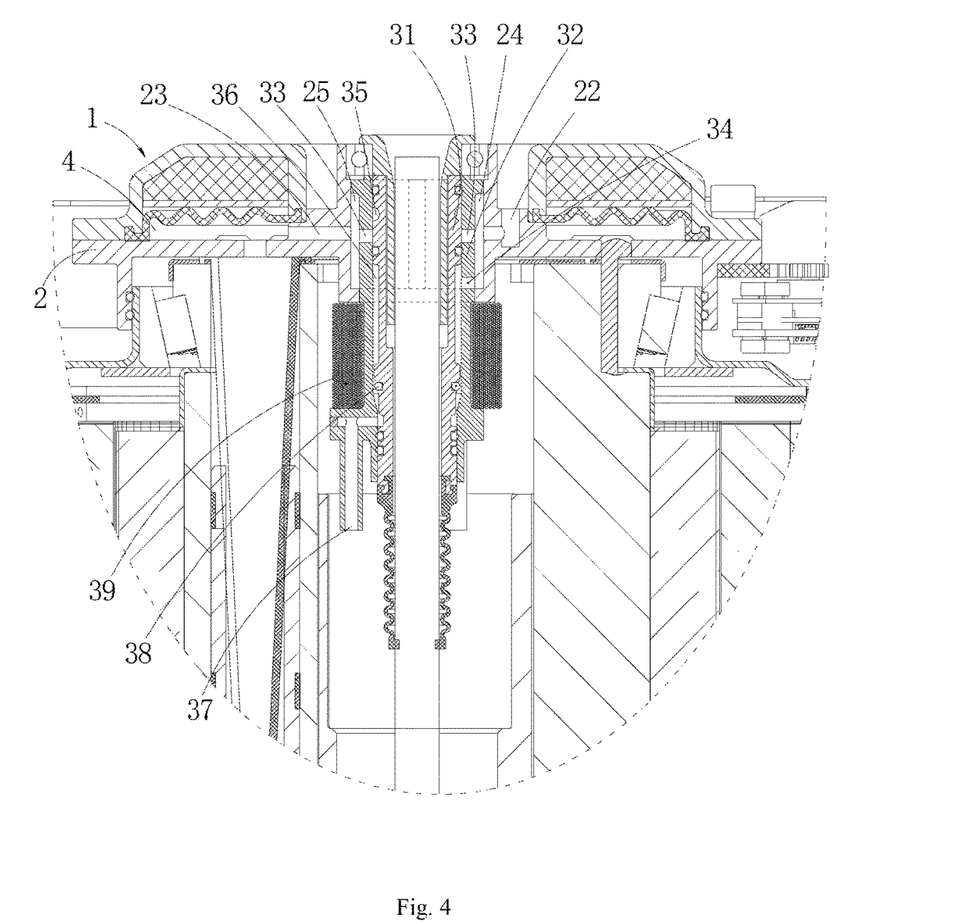
FIG. 4 is a partially enlarged schematic view of a reversing valve portion in FIG. 1.

An inner side of the hollow column 21 is provided with a reversing valve 3, and the reversing valve 3 is provided with a valve core 31 and a valve cavity 32. An inner wall of the hollow column 21 and an outer wall of the valve cavity 32 form a first radial cavity. The first radial cavity is embedded with a pin 6. The first radial cavity is separated by the pin 6 to form two radial cavities which are independent of each other; wherein one of the cavities is oil-distributor oil-inlet cavity 24, and the oil-distributor oil-inlet cavity 24 is in communication with the oil inlet 22.

In order to control on and off states of the input oil fluid, a sidewall of the inner cavity of the hollow column 21 and an outer wall of the valve cavity 32 cooperatively form a first radial cavity; another radial cavity formed by the isolation of the pin 6 embedded therein serves as an oil-distributor oil-outlet cavity 25; the oil-distributor oil-outlet cavity 25 is in communication with the axial cavity 4. An upper portion of a sidewall of the valve cavity 32 is provided with a reversing-valve oil-flow passage 33 arranged to penetrate radially. An axial lower portion of the reversing-valve oil-flow passage 33 is provided with an oil flow hole 34 arranged radially. Furthermore, an oil-flow ring slot 35 with a semicircle shaped section is arranged around an upper portion of an outer wall of the valve core 31; the oil-flow ring slot 35 is respectively in communication with the oil-distributor oil-inlet cavity 24 and the oil-distributor oil-outlet cavity 25. A second radial cavity 36 is formed between an outer wall of a lower end of the valve core 31 and an inner wall of a lower portion of the valve cavity 32. A lower portion of the valve cavity 32 is provided with an oil outlet 37, and the oil outlet 37 is in communication with the second radial cavity 36.

The entry path of the oil fluid is that: the oil fluid enters the oil-distributor oil-inlet cavity 24 from the oil inlet 22, and passes through an oil passage constituted by the reversing-valve oil-flow passage 33 and the oil-flow ring slot 35; the oil fluid then passes through the oil-distributor oil-outlet cavity 25, enters the axial cavity 4, and passes through the aforesaid damping hole 26 to flow into the elastic oil bag 52.

By upward and downward movements of the valve core 31 inside the valve cavity 32, and the cooperation among the oil-flow ring slot 35, a plurality of the O-shaped sealing rings 38, and an inner wall of the valve cavity 32, the communication or block between the oil flow hole 34 and the second radial cavity 36 is realized, and the communication or block between the oil-distributor oil-inlet cavity 24 and the axial cavity 4 is further realized. Surely, in other embodiments, according to actual conditions and requirements, other components or methods can be also adopted to control the on and off states of the oil fluid in the oil flow passage.

In this embodiment, the reversing valve 3 is an electromagnetic reversing valve. The reversing valve 3 further includes a winding coil 39. Specifically, the valve cavity 32 is arranged on the inner wall of an upper portion of the hollow column 21; the winding coil 29 is sheathed around an outer wall of the valve cavity 32; the outer wall is provided with an axial locating flange; the winding coil 39 is located below the hollow column 21 and above the locating flange of the outer wall of the valve cavity 32. Surely, in other embodiments, according to actual conditions and requirements, other types of reversing valves can also be adopted.

In the original state, the oil-flow ring slot 35 and the oil flow passage 23 are staggered; the reversing-valve oil-flow passage 33 is blocked by an outer wall of the valve core 31. At this time, the second radial cavity 36 is in communication with the oil-distributor oil-inlet cavity 24 through the oil flow hole 34, that is, an oil passage formed by the oil-distributor oil-inlet cavity 24 and the second radial cavity 36 forms a clear passage, and an oil passage formed by the oil-distributor oil-inlet cavity 24, the axial cavity 4 and the elastic oil bag 52 is blocked. When the winding coil 39 is electrified, the whole valve core 31 moves down, the oil-flow ring slot 35 is aligned with and in communication with the oil flow passage 33; the O-shaped seal ring 38 at a lower cone of the valve core 31 compresses a circular cone at the bottom of the valve core 32, that is, the second radial cavity 36 is blocked. In this way, the oil passage formed by the oil-distributor oil-inlet cavity 24, the axial cavity 4 and the elastic oil bag 52 forms a clear passage. At the same time, the oil passage formed by the oil-distributor oil-inlet cavity 24 and the second radial cavity 36 is blocked. The reversing and switch function of the reversing valve 3 achieves a switch between the two oil passages, without interference.

Figure 5:
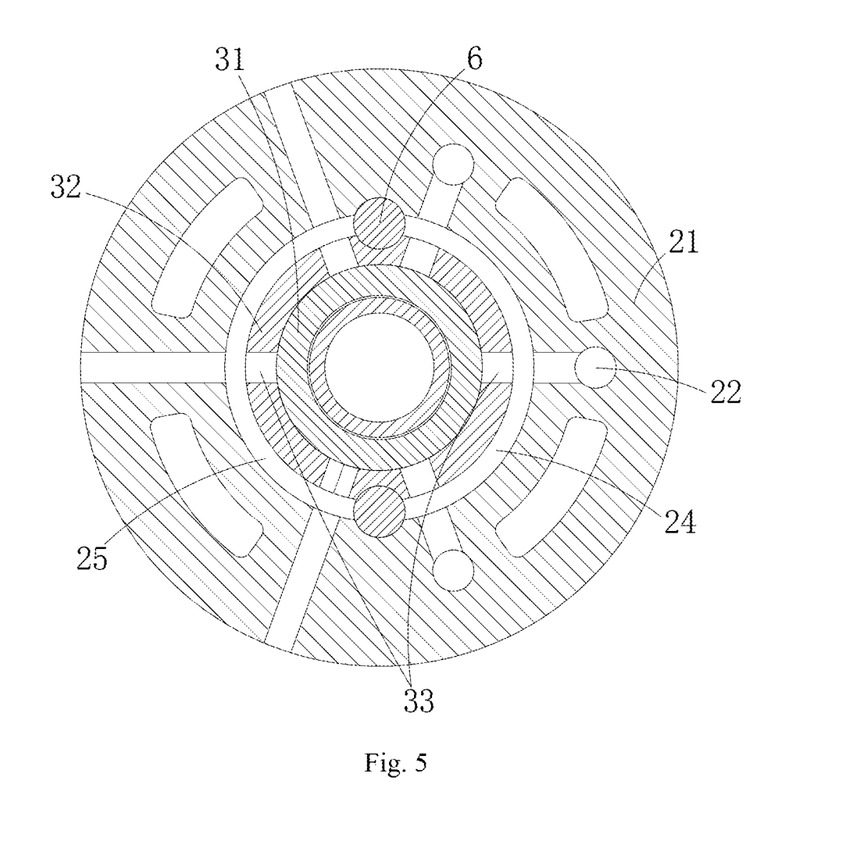
FIG. 5 is a sectional schematic view along the cutting direction A-A of FIG. 1.
Figure 6:
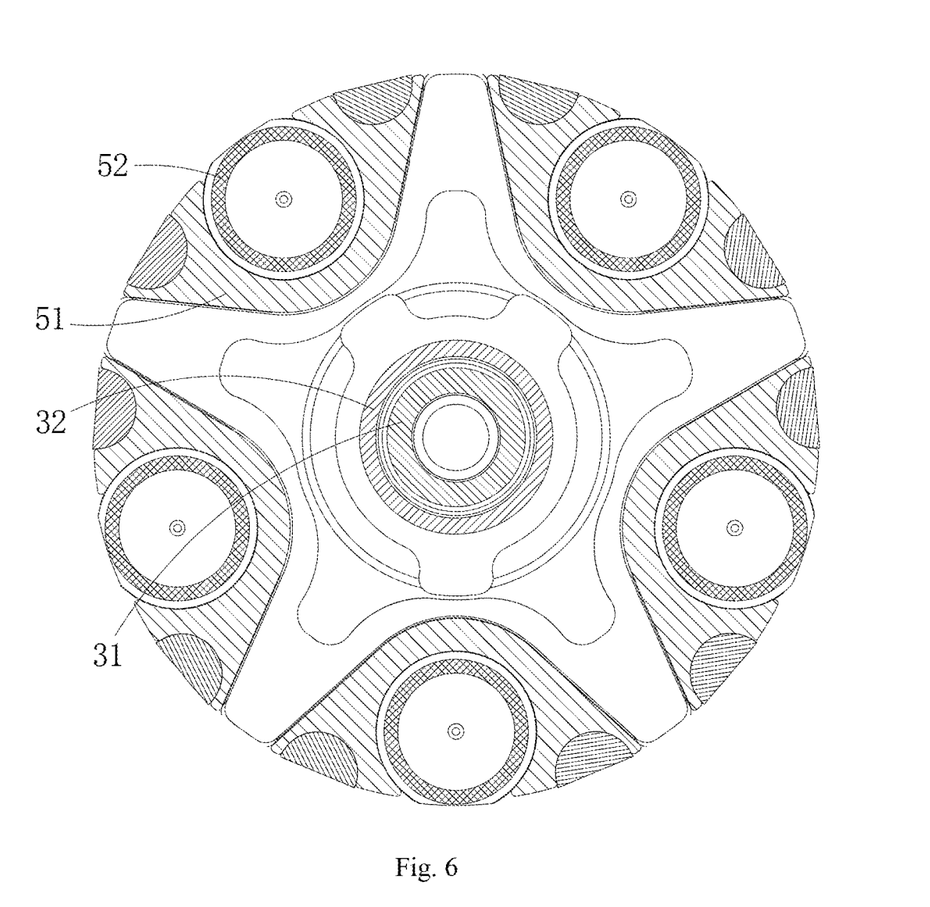
FIG. 6 is a sectional schematic view along the cutting direction B-B of FIG. 1.

In this embodiment, a plurality of groups of the cylinder assemblies 5 are arranged inside the damping mechanism. Each group of the cylinder assemblies 5 are arranged under the oil distributor 2. Upper ends of each group of the cylinder assemblies 5 are all docked with a bottom surface of the oil distributor 2. Naturally, each elastic oil bag 52 of each group of the cylinder assemblies 5 is in communication with the axial cavity 4 through respective damping holes 26. Furthermore, each group of the cylinder assemblies 5 are arranged in circular inside the steering motor. Surely, in other embodiments, the number of the cylinder assemblies 5 can be determined according to the actual conditions, and each group of the cylinder assemblies 5 can also be arranged in other forms.

The above contents are only preferred embodiments of the present invention, and are not intended to limit the present invention. Any improvements, equivalent replacements and modifications made within the spirit and principle of the present invention should be contained within the protection scope of the present invention.

What is claimed is:

1. A shock absorption mechanism of a steering motor, the shock absorption mechanism is arranged inside the steering motor, wherein the shock absorption mechanism comprises an upper cover buffering assembly and an oil distributor arranged under the upper cover buffering assembly; the oil distributor is fitted with the upper cover buffering assembly to form a hermetical axial cavity; a cylinder assembly is fixedly arranged under the oil distributor; the cylinder assembly comprises a cylinder with openings defined at two ends thereof, and an elastic oil bag arranged in the cylinder and defining an opening at an upper end thereof; the upper end of the elastic oil bag is fixedly connected to an inner wall of the cylinder and communicated with the axial cavity; the cylinder is further provided therein with a piston that is capable of sliding axially along the cylinder; the piston is connected to a lower end of the elastic oil bag.

2. The shock absorption mechanism of the steering motor of claim 1, wherein the upper cover buffering assembly comprises an upper cover and a buffering assembly; the buffering assembly comprises an elastomer, an elastic spacer and an elastic diaphragm which are laminated inside the axial cavity in sequence; an edge of the elastic diaphragm is embedded into a lower margin of the inner side of the upper cover and fixedly connected with an inner wall of the axial cavity and forms a seal.

3. The shock absorption mechanism of the steering motor of claim 1, wherein a bottom end of the oil distributor is provided with a damping hole; the damping hole is arranged to be aligned with the top end of the elastic oil bag, and is in communication with the axial cavity and the elastic oil bag respectively.

4. The shock absorption mechanism of the steering motor of claim 3, wherein an aperture of the damping hole is smaller than a caliber of the opening of the upper end of the elastic oil bag.

5. The shock absorption mechanism of the steering motor of claim 2, wherein the elastic diaphragm is butterfly-shaped; the oil distributor and the upper cover buffering assembly are fitted with each other to form a seal through a fastener.

6. The shock absorption mechanism of the steering motor of claim 5, wherein the oil distributor is provided with an oil flow passage arranged radially and in communication with the axial cavity; the oil distributor is provided with an oil inlet; a hollow column that has an inner cavity is arranged axially and extends upwards and downwards respectively inside the oil distributor; an inner wall of the hollow column is provided with an oil flow opening in communication the oil flow passage.

7. The shock absorption mechanism of the steering motor of claim 6, wherein an inner side of the hollow column is provided with a reversing valve which has a valve core; an inner sidewall of the hollow column and an outer wall of the reversing cavity form a first radial cavity; the first radial cavity is embedded with a pin; the first radial cavity is separated by the pin to form an oil-distributor oil-inlet cavity and an oil-distributor oil-outlet cavity which are independent of each other; the oil-distributor oil-inlet cavity is in communication with the oil inlet, and the oil-distributor oil-outlet cavity is in communication with the axial cavity; an upper portion of a sidewall of the valve cavity is provided with a reversing-valve oil-flow passage arranged to penetrate radially; an axial lower portion of the reversing-valve oil-flow passage is provided with an oil flow hole arranged radially; an oil-flow ring slot with a semicircle shaped section is arranged around an outer wall of an upper portion of the valve core; the oil-flow ring slot is respectively in communication with the oil-distributor oil-inlet cavity and the oil-distributor oil-outlet cavity; a second radial cavity is formed between an outer wall of a lower end of the valve core and a sidewall of a lower portion of the valve cavity; a lower portion of the valve cavity is provided with an oil outlet, and the oil outlet is in communication with the second radial cavity.

8. The shock absorption mechanism of the steering motor of claim 7, wherein the reversing valve further comprises a winding coil positioned under the oil distributor and sheathed around a periphery of the valve cavity.

9. The shock absorption mechanism of the steering motor of claim 1, wherein the absorption mechanism comprises a plurality of the cylinder assemblies; each of the cylinder assemblies is positioned under the oil distributor, and is arranged in circular inside the steering motor.

10. The shock absorption mechanism of the steering motor of claim 2, wherein the absorption mechanism comprises a plurality of the cylinder assemblies; each of the cylinder assemblies is positioned under the oil distributor, and is arranged in circular inside the steering motor.

11. The shock absorption mechanism of the steering motor of claim 3, wherein the absorption mechanism comprises a plurality of the cylinder assemblies; each of the cylinder assemblies is positioned under the oil distributor, and is arranged in circular inside the steering motor.

12. The shock absorption mechanism of the steering motor of claim 4, wherein the absorption mechanism comprises a plurality of the cylinder assemblies; each of the cylinder assemblies is positioned under the oil distributor, and is arranged in circular inside the steering motor.

13. The shock absorption mechanism of the steering motor of claim 5, wherein the absorption mechanism comprises a plurality of the cylinder assemblies; each of the cylinder assemblies is positioned under the oil distributor, and is arranged in circular inside the steering motor.

14. The shock absorption mechanism of the steering motor of claim 6, wherein the absorption mechanism comprises a plurality of the cylinder assemblies; each of the cylinder assemblies is positioned under the oil distributor, and is arranged in circular inside the steering motor.

15. The shock absorption mechanism of the steering motor of claim 7, wherein the absorption mechanism comprises a plurality of the cylinder assemblies; each of the cylinder assemblies is positioned under the oil distributor, and is arranged in circular inside the steering motor.

16. The shock absorption mechanism of the steering motor of claim 8, wherein the absorption mechanism comprises a plurality of the cylinder assemblies; each of the cylinder assemblies is positioned under the oil distributor, and is arranged in circular inside the steering motor.

* * * * *